(No Model.) 2 Sheets—Sheet 1.
H. MARTIN & F. G. McHENRY.
DEVICE FOR SPOOLING FENCE WIRE.
No. 373,080. Patented Nov. 15, 1887.
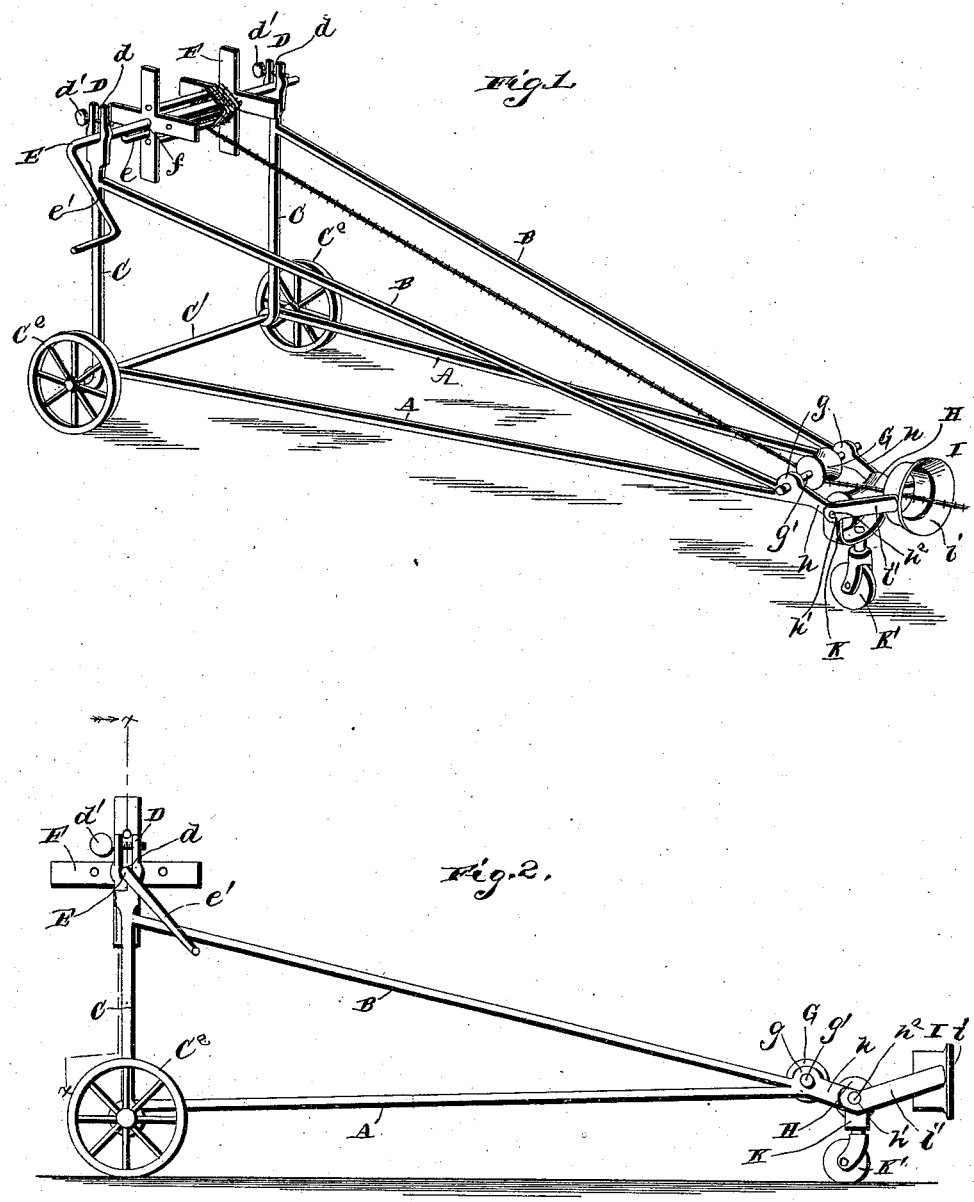

(No Model.) 2 Sheets—Sheet 2.
H. MARTIN & F. G. McHENRY.
DEVICE FOR SPOOLING FENCE WIRE.
No. 373,080. Patented Nov. 15, 1887.
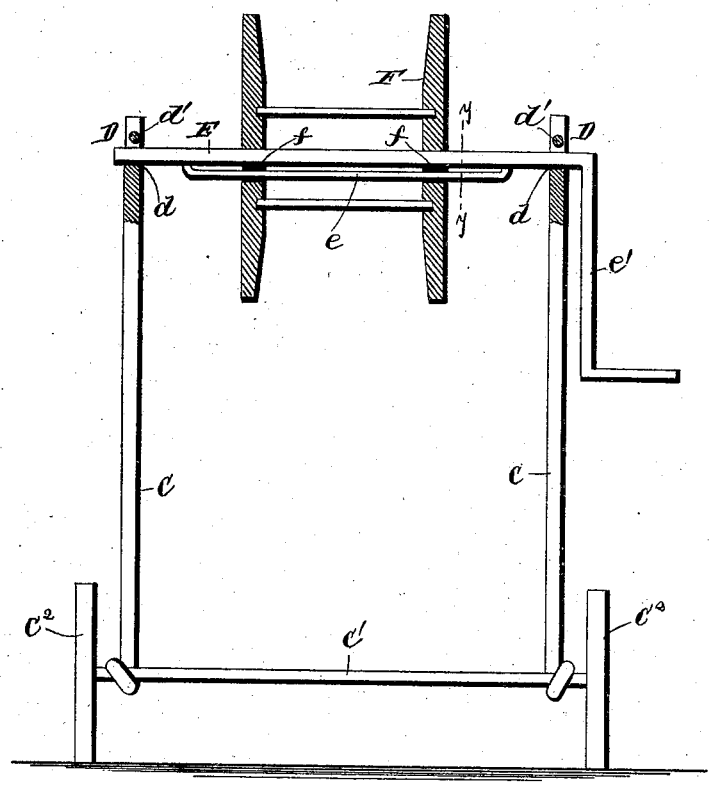
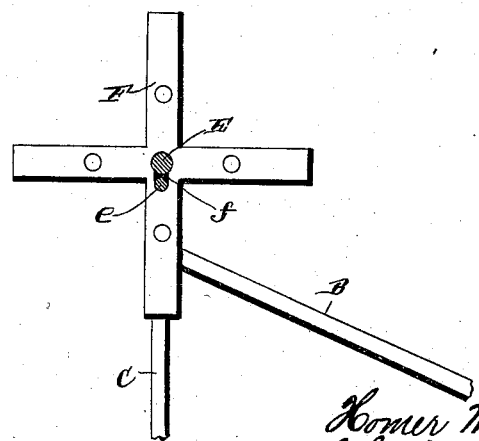

UNITED STATES PATENT OFFICE.

HOMER MARTIN AND FEARGUS GEORGE McHENRY, OF BLOOMINGTON, KANSAS.

DEVICE FOR SPOOLING FENCE-WIRE.

SPECIFICATION forming part of Letters Patent No. 373,080, dated November 15, 1887.

Application filed September 28, 1887. Serial No. 250,936. (No model.)

*To all whom it may concern:*

Be it known that we, HOMER MARTIN and FEARGUS GEORGE McHENRY, citizens of the United States, residing at Bloomington, in the county of Osborne and State of Kansas, have invented a new and useful Improvement in Devices for Spooling Fence-Wire, of which the following is a specification.

Our invention relates to a device for spooling fence-wire when removing the same from the fence; and it consists in the construction and arrangement of the parts thereof, which will be more fully hereinafter described, and particularly pointed out in the claims.

In the accompanying drawings, wherein like letters of reference indicate similar parts in the several views, Figure 1 represents a perspective view of our improved device. Fig. 2 is a side elevation thereof. Fig. 3 is a sectional view on the line $x\ x$ of Fig. 2. Fig. 4 is a detail sectional view on line $y\ y$, Fig. 3.

The frame of our machine is composed of the integral upper and lower beams, A and B, at each side, which converge from the rear to the front of the machine and are connected by cross-journal rods.

C C represent the two rear vertical standards to which the top and bottom frames are secured, the lower ends of which have suitable bearings formed therein, through which an axle, C', passes, having wheels C² mounted thereon. The upper part of each standard is provided with spring-clamps D, which are secured thereto and have openings $d$ therein for the reception of the ends of a spool-shaft, E. The portions of the clamps D above the openings $d$ are provided with screw-bolts $d'$, which pass therethrough and are adapted to bind the clamps against the shaft E with more or less pressure, and thereby allow said shaft to move more or less freely, as will be readily understood.

The shaft E is constructed with a spline, $e$, which engages with a groove, $f$, formed on the spool or reel F, which is mounted on said shaft E and is adapted to be moved thereon when necessary. One end of the shaft E is provided with a handle, $e'$, by which the shaft and the spool are revolved.

The front portion of the machine is formed with bearings $g\ g$, in which a shaft, $g'$, is mounted, carrying a sheave, G. Two arms, $h$, project forward and downwardly from the front portion of the frame and have bearings $h'$ formed in their outer ends, which receive a shaft, $h^2$, carrying a larger sheave, H, bearing on almost the entire shaft $h^2$, and just loose enough to have full play. The sheave G is considerably shorter than the shaft $g'$, upon which it is mounted, and is allowed a movement from one side thereof to the other.

Projecting forward from the shaft $h^2$ is a guide-casting, I, which is formed with a front central flared annular head, $i$, having side ears, $i'$, for securing the same to the frame of the machine. From the rear portion of the ears $i'$ a curved plate, K, depends therefrom, in the central portion of which a caster, K', is swiveled.

The machine is adapted for use in reeling or spooling fence-wire which has already been mounted, and as the wire is spooled the device is caused to move toward the point from which the wire is drawn by the tension exerted, as will be readily understood. The wire passes through the front guide, I, over the sheave H and under the sheave G back to the upper rear portion of the machine, over the reel or spool F, and is wound thereon. As the wire is wound it may diverge from a true central line in coiling on the reel, and to accommodate this movement the sheave G moves from one side to the other on its shaft.

The wire may be readily played out from the machine, when it is desired to remount it, through the same mechanism with which it engaged in spooling.

It will be seen by our construction that a convenient machine is provided, which takes up and protects the wire, and being formed light it is readily handled and operated.

Having thus described our invention, what we claim as new is—

1. A fence-wire-reeling device comprising a supporting-frame composed of integral upper and lower beams on each side converging toward the front of the machine, the guide and sheaves in the front part of the frame, and the reel or spool at the rear upper portion thereof, substantially as described.

2. The combination of the supporting-frame having the guide and sheaves in the forward portion thereof, the rear standards having the spring-clamps, the shaft E, having the spline thereon, and the reel or spool having the groove mounted on said shaft, substantially as described.

3. The combination of the supporting-frame having the reel or spool movably mounted in the rear portion thereof, the guide I in the front portion of the frame, and the movable sheave G, substantially as described.

4. The combination of the supporting-frame, the shaft E, the reel F, and the standards having spring-clamps D, to regulate the speed of the shaft E, which is mounted therein, substantially as described.

5. The supporting-frame, as set forth, the annular guide I, having flanges, as described, and ears, shaft $h^2$, sheave H, shaft $g'$, sheave G, and the depending curved plate carrying a swiveled roller, in combination with the rear elevated reel or spool F, having a groove engaging with a spline on its shaft E, substantially as described.

6. In combination with the supporting-frame, the laterally-movable reel F and the laterally-movable sheave G, the wire being attached to the reel and passing under the sheave.

7. In combination with the supporting-frame having the spring-clamps D, provided with screws $d'$, the shaft E, mounted in the clamps D, and the reel or spool F, carried by the shaft, as set forth.

8. In combination with the supporting-frame having the shaft E, the reel F, having a spline-and-groove connection with the shaft to permit the reel to move laterally, the laterally-movable sheave G at the forward end of the machine, the sheave H, and the guide I, as set forth.

In testimony that we claim the foregoing as our own we have hereto affixed our signatures in presence of two witnesses.

HOMER MARTIN.
FEARGUS GEORGE McHENRY.

Witnesses:
Z. T. WALROND,
JOHN G. ECKMAN.